(12) United States Patent
Kim

(10) Patent No.: US 9,680,346 B2
(45) Date of Patent: Jun. 13, 2017

(54) SCREW MOTOR AND METHOD OF MANUFACTURING THE SAME

(71) Applicant: LG INNOTEK CO., LTD., Seoul (KR)

(72) Inventor: Jinho Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 700 days.

(21) Appl. No.: 14/107,421

(22) Filed: Dec. 16, 2013

(65) Prior Publication Data
US 2014/0167540 A1 Jun. 19, 2014

(30) Foreign Application Priority Data

Dec. 17, 2012 (JP) .......................... 10-2012-0147300

(51) Int. Cl.
| H02K 7/06 | (2006.01) |
| H02K 7/116 | (2006.01) |
| H02K 15/03 | (2006.01) |

(52) U.S. Cl.
CPC ............ *H02K 7/116* (2013.01); *H02K 7/063* (2013.01); *H02K 15/03* (2013.01); *Y10T 29/49012* (2015.01)

(58) Field of Classification Search
CPC .............................. H02K 7/06; H02K 5/1732
USPC ........................................ 310/80, 43, 71, 15
See application file for complete search history.

(56) References Cited

U.S. PATENT DOCUMENTS

| 5,093,593 | A | * | 3/1992 | Philipp | .............. | A61B 17/1622 310/47 |
| 5,437,349 | A | | 8/1995 | Kurahashi et al. | | |
| 7,541,707 | B2 | * | 6/2009 | Hochhalter | ............ | B23K 11/31 310/80 |
| 7,687,957 | B2 | * | 3/2010 | Ochiai | ................... | H02K 1/278 310/156.08 |
| 2002/0043880 | A1 | * | 4/2002 | Suzuki | ..................... | H02K 7/06 310/12.14 |
| 2004/0051415 | A1 | * | 3/2004 | Hamamura | ............ | H02K 15/03 310/156.28 |
| 2004/0135448 | A1 | * | 7/2004 | Matsushita | ........... | F16C 19/163 310/90 |
| 2004/0164623 | A1 | * | 8/2004 | Suzuki | ................... | H02K 15/02 310/49.18 |
| 2007/0164622 | A1 | * | 7/2007 | Suzuki | ............... | F16H 25/2015 310/80 |
| 2009/0230805 | A1 | | 9/2009 | Ikeno | | |
| 2011/0095629 | A1 | | 4/2011 | Lee | | |

FOREIGN PATENT DOCUMENTS

KR 10-2004-0089866 A 10/2004

OTHER PUBLICATIONS

European Search Report dated Dec. 2, 2016 issued in Application No. 13197236.6.
Hanselman, Dunae: "Radial Flux Motors" In: "Brushless Permanent Magnet Motor Design"; Jan. 1, 2006 (Jan. 1, 2006) Magna Physics Publishing, Lebanon, Ohio, USA, pp. 117-120; XP055356629.
European Search Report dated Apr. 5, 2017 issued in Application No. 13197236.6.

* cited by examiner

*Primary Examiner* — Thanh Lam
(74) *Attorney, Agent, or Firm* — KED & Associates, LLP

(57) ABSTRACT

A screw motor includes a stator, a rotor that is rotatably received in the stator and includes a rotor core, and a screw shaft that is coupled to the rotor core to contact the rotor core.

13 Claims, 5 Drawing Sheets

SCREW MOTOR AND METHOD OF MANUFACTURING THE SAME

CROSS-REFERENCE TO RELATED APPLICATION

This application claims priority to and the benefit of Korean Patent Application No. 10-2012-0147300, filed on Dec. 17, 2012, the disclosure of which is incorporated herein by reference in its entirety.

BACKGROUND

1. Field

The present application relates to a motor, and more particularly, to a screw motor and a method of manufacturing the same.

2. Background

Motors which are devices for converting electrical energy into mechanical energy are widely used in various industrial applications.

Motors are used as devices for providing power in various applications such as electric bicycles, compressors, and braking systems for vehicles.

Recently, attempts to apply a screw motor that enables an object connected to a rotating shaft of a rotor to receive a rotational force of the rotor and to linearly move instead of rotating to a booster of a braking system for a vehicle have been actively made.

A screw is formed on the rotating shaft of the rotor of the screw motor. Accordingly, when the rotating shaft of the rotor of the screw motor is inserted into the object in which a spiral groove is formed and begins to rotate, the object linearly moves, not rotates.

A rotor of a conventional screw motor includes a rotor core to a surface of which a magnet is attached, a rotor tube that is inserted into the rotor core, and a screw shaft that is inserted into the rotor tube.

Since the rotor of the conventional screw motor has a problem in that since the rotor includes the rotor tube, operation efficiency is reduced, thereby increasing manufacturing costs.

Also, the rotor of the conventional screw motor has another problem in that since inertia of the rotor is increased due to the rotor tube, a response speed of the conventional screw motor is reduced, thereby degrading the performance of the conventional screw motor.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
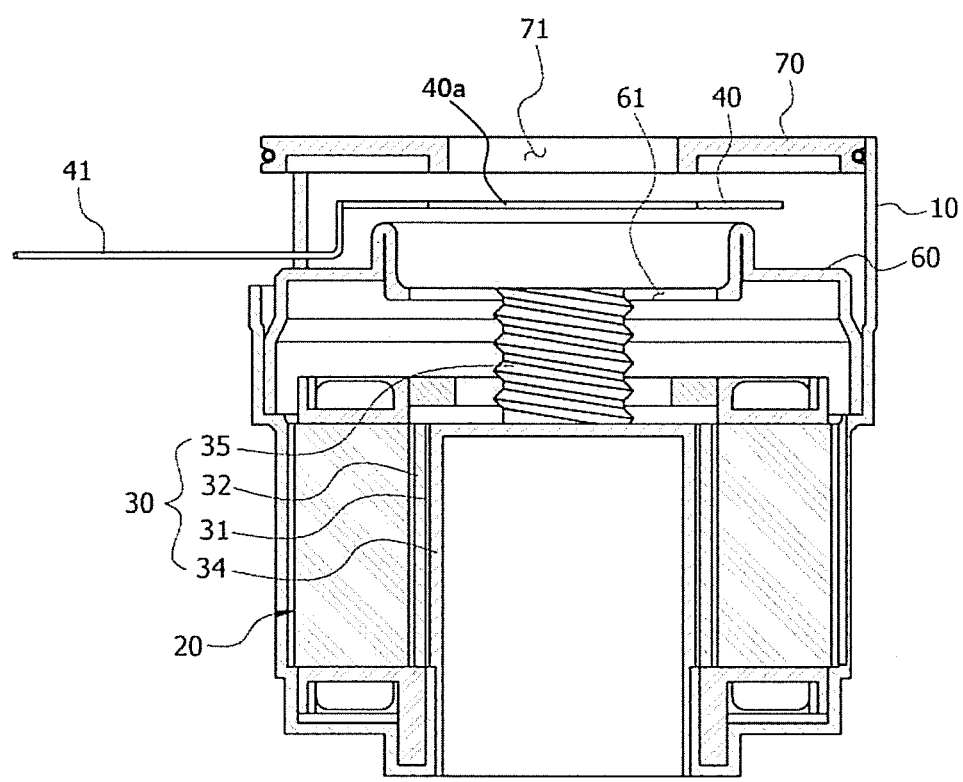
FIG. 1 is a cross-sectional view taken in an axial direction, illustrating a screw motor according to an embodiment of the present application.

As the application allows for various changes and numerous embodiments, particular embodiments will be illustrated in the drawings and described in detail in the written description. However, this is not intended to limit the present application to particular modes of practice, and it is to be appreciated that all changes, equivalents, and substitutes that do not depart from the spirit and technical scope of the present application are encompassed in the present application.

It will be understood that, although the terms first, second, third etc. may be used herein to describe various elements, these elements should not be limited by these terms. These terms are only used to distinguish one element from another element. Thus, a first element discussed below could be termed a second element and, similarly, a second element could be termed a first element without departing from the teachings of exemplary embodiments. As used herein, the term "and/or," includes any and all combinations of one or more of the associated listed items.

It will be understood that when an element is referred to as being "on," "connected to," or "coupled to" another element, it may be directly on, connected to, or coupled to the other element or intervening elements may be present. In contrast, when an element is referred to as being "directly on," "directly connected to," or "directly coupled to" another element, there are no intervening elements.

The terminology used herein is for the purpose of describing particular embodiments only and is not intended to be limiting of exemplary embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present application will now be described more fully with reference to the accompanying drawings, in which exemplary embodiments of the present application are shown. In the drawings, the same elements are denoted by the same reference numerals and a repeated explanation thereof will not be given.

FIG. 1 is a cross-sectional view taken in an axial direction, illustrating a screw motor according to an embodiment of the present application.

Referring to FIG. 1, the screw motor includes a housing 10, a stator 20 that is received in the housing 10, and a rotor 30 that is rotatably received in the stator 20. The screw motor further includes a printed circuit board (PCB) assembly 40 for driving the screw motor, a stator cover 60 that covers the top of the stator 20 in a state where the stator 20 and the rotor 30 are received in the housing 10, and a housing cover 70 that covers the top of the housing 10 in a state where the PCB assembly 40 is disposed over the stator cover 60.

The housing 10 may be formed to have a cylindrical shape. The bottom of the housing 10 is open so that the rotor 10 may be exposed to the outside, and the top of the housing 10 is open so that an element of the screw motor such as the stator 20 may be introduced into the housing 10.

The stator 20 includes a stator core (not shown) that has a cylindrical shape, a plurality of teeth (not shown) that protrude into the stator core, and a coil (not shown) that is wound around the plurality of teeth and receives power to form a rotating magnetic field.

The stator 20 is coupled to the housing 10 by being pressed into the housing 10. However, the present embodiment is not limited thereto, and the stator 20 may be coupled to the housing 10 by using fastening means such as bolts in a state where the stator 20 is introduced into the housing 10. The stator 20 is well known in the motor art, and thus a detailed explanation thereof will not be given.

A first through-hole 61 through which a part of the rotor 30 passes is formed in the stator cover 60, and the stator cover 60 is coupled to the housing 10 in a state where the rotor 30 is introduced into the stator 20. The stator cover 60 prevents a foreign material from penetrating into the stator 20.

A third through-hole 40a through which a part of the rotor 30 passes is formed in the PCB assembly 40. The PCB assembly 40 includes a power terminal 41 for receiving external power and a driving unit (not shown) for driving the screw motor. The PCB assembly 40 receives external power and applies the external power to the coil (not shown) of the stator 20, so that the stator 20 may form a rotating magnetic field.

A second through-hole 71 through which a part of the rotor 30 passes is formed in the housing cover 70. The stator 20, the rotor 30, the stator cover 60, and the PCB assembly 40 are sequentially received in the housing 10, and then are coupled to the housing 10.

The rotor 30 and a screw shaft 34 of the screw motor will now be explained in more detail.

Figure 2:
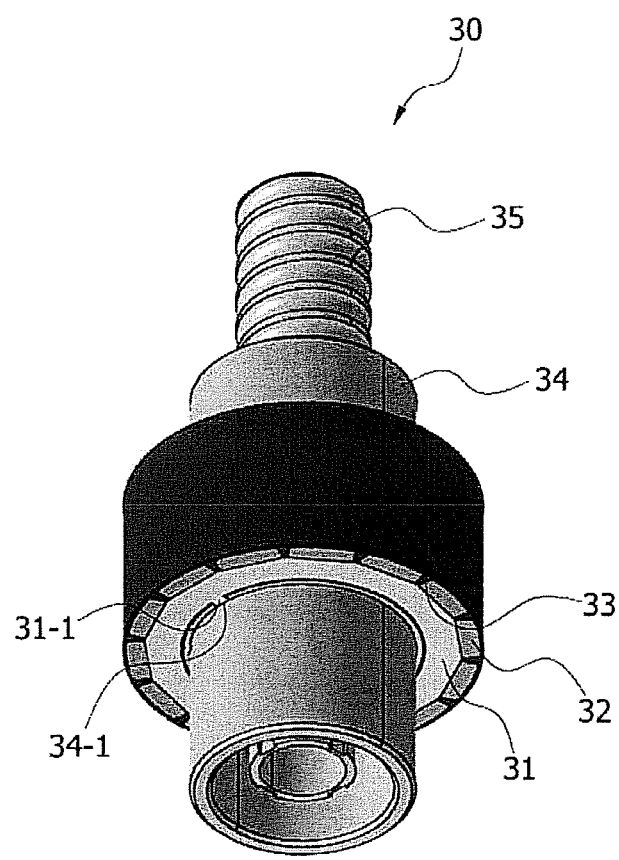
FIG. 2 is a perspective view illustrating a screw shaft and a rotor of the screw motor coupled to each other, according to an embodiment of the present application.

FIG. 2 is a schematic view illustrating the rotor 30 and the screw shaft 34 of the screw motor, according to an embodiment of the present application.

Referring to FIG. 2, the rotor 30 of the screw motor includes a rotor core 31 that has a cylindrical shape, a plurality of magnets 32 that are attached to a surface of the rotor core 31, and a molding member 33 that firmly attaches the plurality of magnets 32 to the rotor core 31.

The rotor core 31 has a cylindrical shape. A coupling protrusion 31-1 is formed on an inner surface of the rotor core 31. The coupling protrusion 31-1 axially extends and is inserted into a coupling groove 34-1 that is formed in an outer surface of the screw shaft 34.

The coupling protrusion 31-1 that is longitudinally formed in an axial direction S of the rotor core 31 increases a coupling force between the rotor core 31 and the screw shaft 34 and prevents slip torque.

The plurality of magnets 32 are formed to have planar shapes, and are attached to an outer surface of the rotor core 31 by using the molding member 33.

The coupling groove 34-1 is formed on the outer surface of the screw shaft 34 to have a shape corresponding to that of the coupling protrusion 31-1. Accordingly, when the screw shaft 34 is inserted into the rotor core 31, the coupling protrusion 31-1 is inserted into the coupling groove 34-1. In this structure, the coupling force between the rotor core 31 and the screw shaft 34 is increased, a rotation in a circumferential direction is limited, and thus slip torque is prevented. If a plurality of the coupling protrusions 31-1 and the coupling grooves 34-1 are formed, slip torque may be further prevented.

A screw 35 is screwed into the screw shaft 34. Accordingly, the screw 35 linearly moves as the screw shaft 34 rotates. A coupling structure between the screw shaft 34 and the screw 35 may be a ball screw coupling structure.

Figure 3:
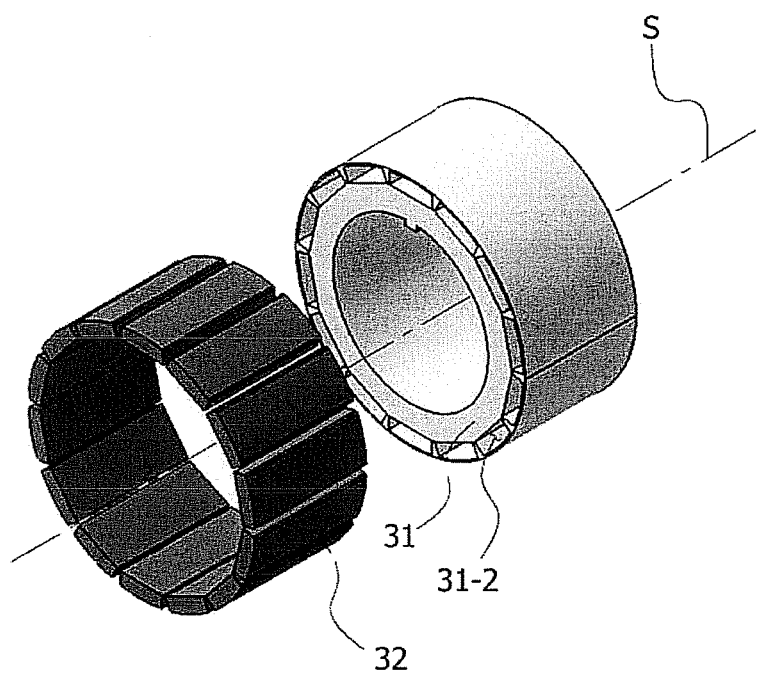
FIG. 3 is a perspective view illustrating a coupling structure between a rotor core and magnets, according to another embodiment of the present application.

FIG. 3 is a perspective view illustrating a coupling structure between the rotor core 31 and the magnets 32, according to another embodiment of the present application.

Referring to FIG. 3, the coupling structure between the rotor core 31 and the magnets 32 according to another embodiment of the present application does not use the molding member 33, unlike a coupling structure between the rotor core 31 and the magnets 32 of FIG. 2. That is, a magnet insertion hole 31-2 is formed in the axial direction S of the rotor core 31 around the outer surface of the rotor core 31, and the magnets 32 are coupled to the rotor core 31 by being inserted into the magnet insertion hole 31-2. In this coupling structure between the rotor core 31 and the magnets 32 of FIG. 3, a molding process using the molding member 33 is omitted, thereby reducing manufacturing costs.

A method of manufacturing the screw motor according to an embodiment of the present application will now be explained with reference to FIGS. 4 and 5.

Figure 4:
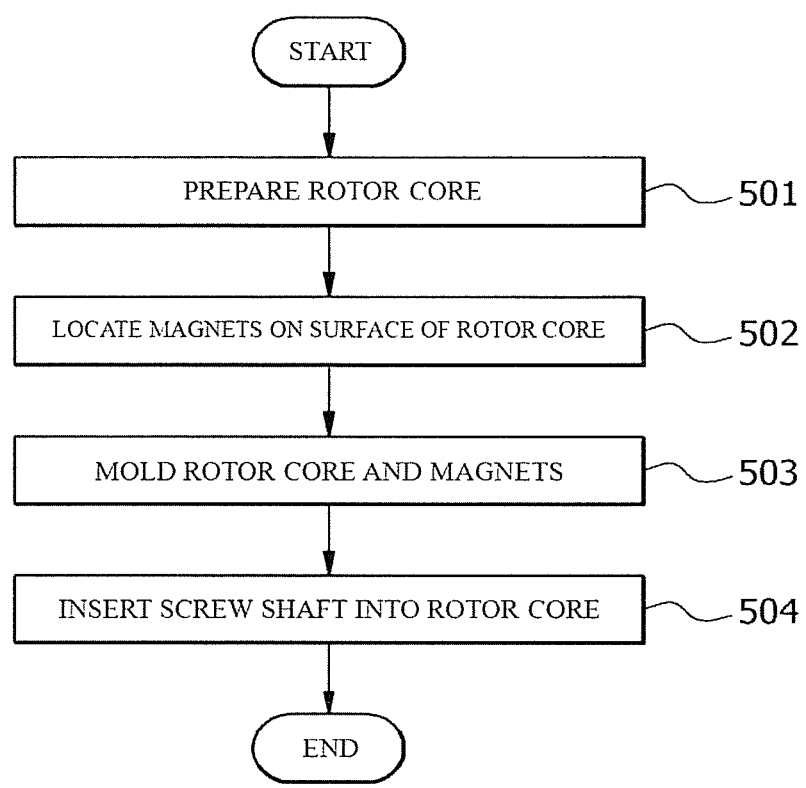
FIG. 4 is a flowchart illustrating a method of manufacturing the screw motor, according to an embodiment of the present application.

FIG. 4 is a flowchart illustrating a method of manufacturing the screw motor, according to an embodiment of the present application. FIG. 5 is an exploded perspective view for describing the method of FIG. 4.

Figure 5:
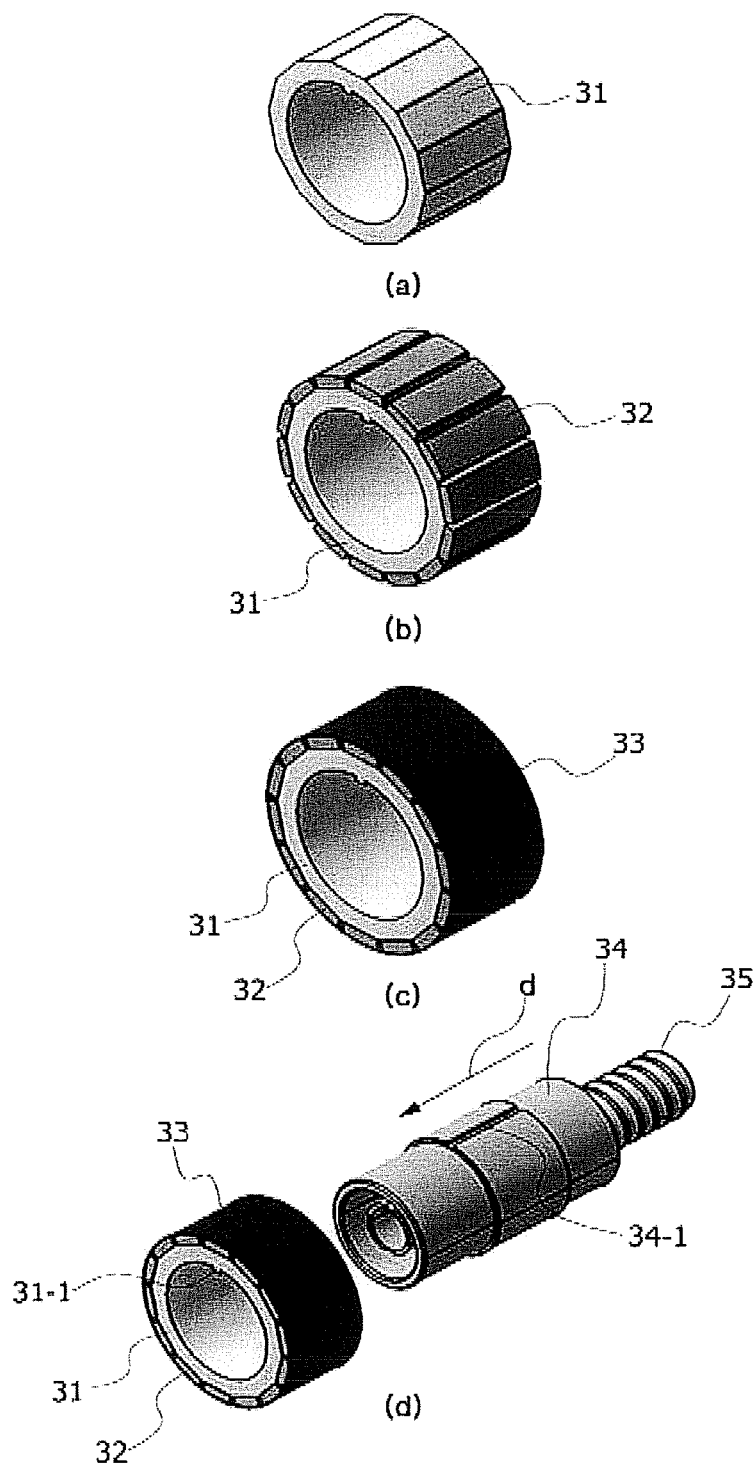
FIG. 5 is an exploded perspective view for describing the method of FIG. 4.

Referring to FIGS. 4 and 5, in operation 501, the rotor core 31 is prepared as shown in (a) of FIG. 5.

Next, in operation 502, the magnets 32 are located on a surface of the rotor core 31 as shown in (b) of FIG. 5. For example, the magnets 32 may be temporarily located on the surface of the rotor core 31 using an adhesive.

Next, in operation 503, the rotor core 31 and the magnets 32 are molded by using the molding member 33 as shown in (c) of FIG. 5.

Finally, in operation 504, the screw shaft 34 is inserted in a coupling direction "d" marked by an arrow into the rotor core 31. In this case, the coupling protrusion 31-1 is inserted into the coupling groove 34-1.

According to the one or more embodiments of the present application, the operation efficiency of a screw motor is improved and inertia of a rotor is reduced.

The present application is directed to a screw motor that has high operation efficiency and includes a rotor having a small inertial force.

According to an aspect of the present application, there is provided a screw motor including: a stator; a rotor that is rotatably received in the stator and includes a rotor core; and a screw shaft that is coupled to the rotor core.

According to another aspect of the present application, there is provided a method of manufacturing a screw motor, the method including: preparing a rotor core; locating magnets on a surface of the rotor core; molding the rotor core and the magnets by using a molding member; and coupling a screw shaft to the rotor core by inserting the screw shaft into the rotor core.

Any reference in this specification to "one embodiment," "an embodiment," "example embodiment," etc., means that a particular feature, structure, or characteristic described in connection with the embodiment is included in at least one embodiment of the application. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A screw motor comprising:
a stator;
a rotor that is rotatably disposed in the stator and comprises a rotor core; and
a screw shaft that is inserted into the rotor core and integrally rotates along with the rotor core, wherein the screw shaft includes a coupling groove that is disposed on an outer surface of the screw shaft and that axially extends, and
wherein the rotor core includes a coupling protrusion that is disposed on an inner surface of the rotor core and is inserted into the coupling groove.

2. The screw motor of claim 1, further comprising a screw that is inserted into the screw shaft and linearly moves as the screw shaft rotates.

3. The screw motor of claim 1, wherein the rotor comprises:
magnets that are mounted on an outer circumferential surface of the rotor core; and
a molding member that covers the magnets.

4. The screw motor of claim 1, wherein the screw shaft includes a plurality of the coupling grooves that are formed along an outer circumferential surface of the screw shaft.

5. The screw motor of claim 1, wherein the rotor core includes a plurality of magnet insertion holes that are formed in an axial direction of the screw shaft,
wherein the magnets are inserted into the plurality of magnet insertion holes.

6. The screw motor of claim 1, further comprising a housing in which the stator, the rotor, and the screw shaft are received.

7. The screw motor of claim 6, further comprising a stator cover that is disposed in the housing and that hermetically closes the stator.

8. The screw motor of claim 7, wherein the stator cover comprises a first through-hole through which the screw passes.

9. The screw motor of claim 8, further comprising a housing cover that is coupled to one side of the housing and that hermetically closes the stator cover.

10. The screw motor of claim 9, wherein the housing cover comprises a second through-hole through which the screw passes.

11. The screw motor of claim 9, further comprising a printed circuit board (PCB) assembly that is disposed between the stator cover and the housing cover, and that applies external power to the stator.

12. The screw motor of claim 11, wherein the PCB assembly comprises a third through-hole through which the screw passes.

13. The screw motor of claim 11, wherein the PCB assembly comprises a power terminal that receives external power.

* * * * *